United States Patent [19]

Murphy

[11] Patent Number: 5,526,994
[45] Date of Patent: Jun. 18, 1996

[54] FILAMENT-WOUND ISOTENSOID PRESSURE VESSELS HAVING GEODESIC DOMES

[75] Inventor: James C. Murphy, Chardon, Ohio

[73] Assignee: Essef Corporation, Chardon, Ohio

[21] Appl. No.: 347,693

[22] Filed: Dec. 1, 1994

[51] Int. Cl.⁶ .................................................. B65H 81/00
[52] U.S. Cl. ........................ 242/437.3; 220/589; 220/590
[58] Field of Search .................................. 242/7.21, 7.22; 220/584, 589, 590

[56] References Cited

U.S. PATENT DOCUMENTS

| | | | |
|---|---|---|---|
| 3,331,722 | 7/1967 | Ponemon | 242/7.21 |
| 3,486,655 | 12/1969 | Ragettli | 220/590 |
| 3,977,614 | 8/1976 | Hardwick | 242/7.21 |
| 4,610,402 | 9/1986 | Corbett et al. | 242/7.22 |
| 4,690,295 | 9/1987 | Wills | 220/590 |
| 4,785,956 | 11/1988 | Kepler et al. | 220/590 |
| 5,284,996 | 2/1994 | Vickers | 220/590 |
| 5,441,584 | 8/1995 | Mathieu et al. | 220/590 |

*Primary Examiner*—Katherine Matecki
*Attorney, Agent, or Firm*—Pearne, Gordon, McCoy & Granger

[57] ABSTRACT

A filament-wound pressure vessel having a pressure vessel liner and a continuous filament polar wound over the surface of the liner in an isotensoid pattern. The liner has a geodesic dome surface extending between a diameter of the liner and a polar opening. The dome surface is defined by oppositely curving surfaces of revolution of a meridia joined by an inflection point. The first surface of revolution curves from the liner diameter to a first point just unto but not at said inflection point. The second surface of revolution curves from the polar opening to a second point just unto but not at said inflection point in a direction opposite the curvature of the first surface of revolution. The first and second surfaces are joined, and the inflection point is traversed by a straight line third surface of revolution closely approximating geodesic curvature through the inflection point.

8 Claims, 2 Drawing Sheets

FILAMENT-WOUND ISOTENSOID PRESSURE VESSELS HAVING GEODESIC DOMES

BACKGROUND OF THE INVENTION

This invention relates to filament-wound pressure vessels and, more particularly, to pressure vessels having geodesic domes with polar openings and which are filament-wound with a continuous filament that is subject to isotensoid loading upon pressurization of the vessel.

Filament-wound pressure vessels have been widely accepted as vessels for the containment of pressurized fluid in those applications that require high stress levels and low density, excellent corrosion, impact, shatter resistance, and highly predictable burst and cycle characteristics. Various winding patterns have been employed for pressure vessels, and those patterns are typically circumferential or hoop winding, helical winding, and polar winding. The winding patterns of a domed pressure vessel must be carefully chosen to prevent fiber slippage and shear loads on the filament. An ideal dome shape for pressure vessels is an isotensoid or geodesic dome, or end closure. The shape of this dome depends upon the diameter of the pressure vessel and the diameter of the polar opening in the vessel. According to the prior art, such a geodesic dome surface is a surface of revolution requiring a numerical solution for each polar opening diameter and pressure vessel diameter. This solution enables one to progressively plot the curvature of the dome from the diameter of the pressure vessel toward the polar opening. This mathematical progression, however, becomes indeterminent at an inflection point at a radial location of $1.22r_0$ where $r_0$ is the radius of the polar opening. In standard prior art design procedures, a fitting or boss having an outer radius which is greater than $1.22r_0$ is inserted in the tank, and the winding surface over the boss is commonly conical or spherical. Since the boss, in effect, eliminates the inflection point, shear stress on the filament is avoided. The provision of such a boss greatly increases the cost of the pressure vessel and its weight.

SUMMARY OF THE INVENTION

This invention overcomes the inflection point problem by providing a winding mandrel for a filament-wound pressure vessel which has a geodesic surface providing isotensoid loading of the filament wound thereon. The surface extends between the diameter of the mandrel and a polar opening and is defined by first and second oppositely curving surfaces of revolution of a meridia joined by an inflection point. The first surface of revolution curves from the diameter to a first point just unto, but not at, said inflection point. The second surface of revolution curves from the polar opening to a second point just unto, but not at, the inflection point in a direction opposite the curvature of the first surface of revolution. The first and second surfaces are joined, and the inflection point is traversed by a straight line third surface of revolution which closely approximates geodesic curvature through the inflection point.

DETAILED DESCRIPTION OF THE INVENTION

Figure 1:
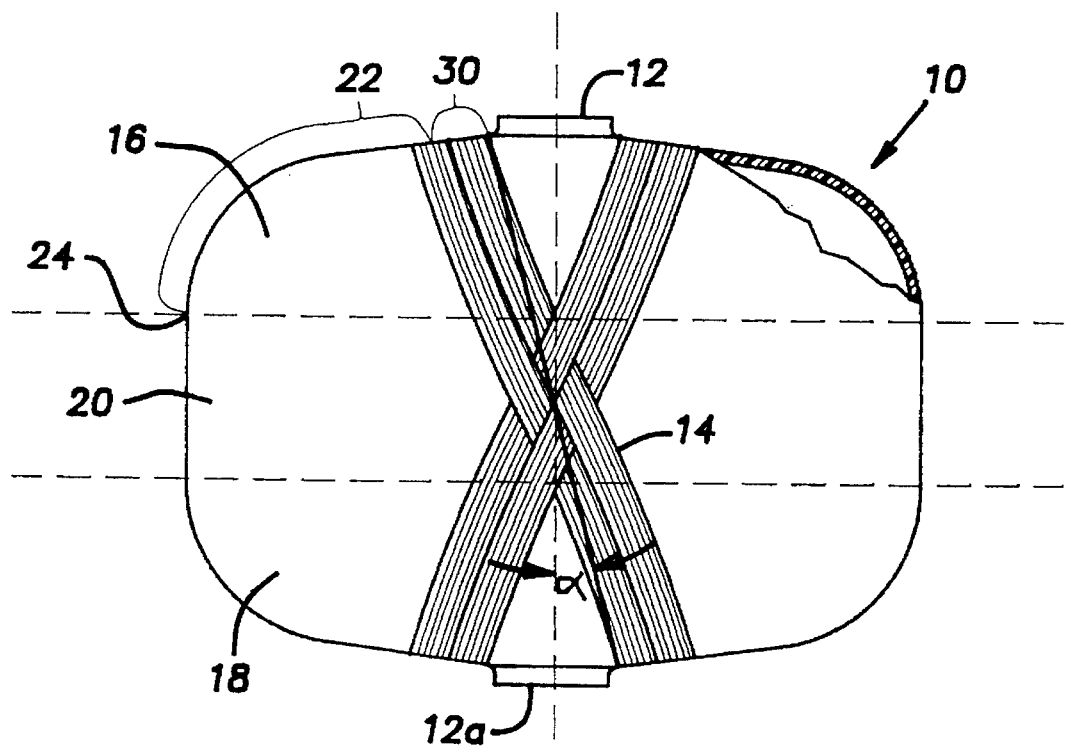
FIG. 1 is an elevational view of a pressure vessel liner having geodesic dome surfaces and illustrating the liner partially wound with an isotensoid filament.

Referring to FIG. 1, there is illustrated a winding mandrel or, in the particular embodiment illustrated, a tank liner 10 having at least one polar opening 12. Polar openings may be provided on both ends of the liner if the tank is to be provided with upper and lower access ports, or a winding boss may be fused to or otherwise affixed to the liner to provide a winding boss 12a. The liner may be molded from a suitable plastic resin, and its primary purpose is to serve as a winding mandrel for a load-carrying filament winding 14 which progresses in a polar winding pattern about the polar openings 12 or the polar opening 12 and the winding boss 12a at a wind angle of $\alpha$.

The liner has upper and lower domed geodesic surfaces 16 and 18 which are, in the illustrated embodiment, joined by a cylindrical side wall 20. However, the cylindrical side wall may be omitted, and the domes 16 and 18 may meet at a line defining the diameter of the pressure vessel. Further, the liner may be a one-piece in it made by blow-molding or rotational casting, or the liner may be a two-piece, injection-molded in it joined by a gasket assembly at a circumferential mid-point.

The filaments 14 comprise winding bands of glass, an aramid, carbon filaments, or the like. The winding is conducted in accordance with known polar winding techniques.

Figure 2:
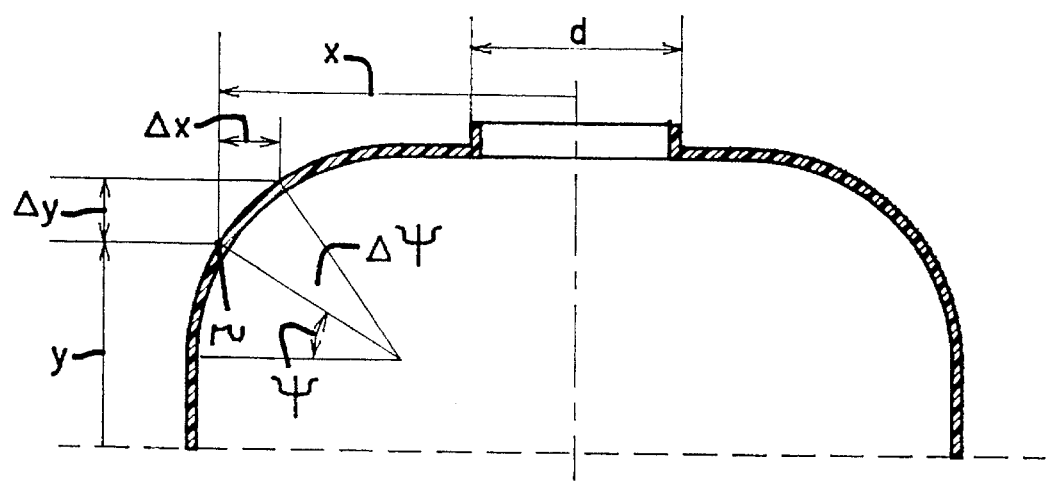
FIG. 2 is a cross-sectional illustration of a dome portion of the liner illustrated in FIG. 1.

Referring now to FIG. 2, there is illustrated a geodesic dome profile where no bending loads are permitted in the winding filaments. Such a shape is commonly designated as an isotensoid shape. It is common knowledge that if a length of the fiber is in moment equilibrium about the axis of the vessel, the local wind angle $\Theta$ at a radial location r is given by:

$$\Theta = \sin^{-1}\left( \frac{(d/2)}{x} \right) \qquad (1)$$

where $\Theta$= the local filament wind angle;

D=the vessel diameter; and d= the polar diameter.

When x is equal to the radius of the vessel, or D/2, then $$\Theta = \sin^{-1}(d/D)$$

The forces on a dome element at an angle $\psi$, which is the angle defined by the meridia at a radial location x on the surface traced by the meridia are given by:

$$N_m = \left( \frac{x}{\cos\psi} \right)(D/2) \qquad (2)$$

and $$N_h = \left( \frac{x}{\cos\psi} \right)\left( D - \frac{N_m}{r} \right) \qquad (3)$$

where

Nm= force per unit length in the meridial direction;

Nh= force per unit length in the hoop direction; and r= the radius of curvature of the meridia.

For a filament wound dome:

$$\frac{N_h}{N_m} = \tan^2\Theta \quad (4)$$

solving for r in equation (3) by substituting equation (2) and (4) yields $$r = \frac{x}{\cos\psi(2 - \tan^2\Theta)} \quad (5)$$

Equation (5) defines the equilibrium dome contour for a first curved surface portion 22, as indicated by the brackets in FIG. 1.

Starting at the point of intersection between the dome 16 and the cylindrical side wall 20, or position 24 in FIG. 1, $\psi = 0$ and $x = D/2$, angle $\psi$ is incremented by an amount $\Delta\psi$. At the first increment, $\psi = 0+\Delta\psi = \Delta\psi$. From this relationship, r can be determined from equation (5). Also, $$\Delta x = r\Delta\psi \sin\psi$$

$$\Delta y = r\Delta\psi \cos\psi.$$

In general, $$\psi = \psi + \Delta\psi$$

$$x = D/2 - \Sigma \Delta x$$

$$y = \Sigma \Delta y$$

The solution proceeds step-by-step to produce a number of points constituting the curve until $\tan^2\Theta = 2$. At this point, $r = 1.22 \, (d/2)$. It should be noticed that r, as expressed in equation (5), becomes undefined. That is to say, r approaches infinity when the curve reaches, a point of inflection, and further movement along the curve toward the polar opening requires that the surface reverse its concavity.

Figure 3:
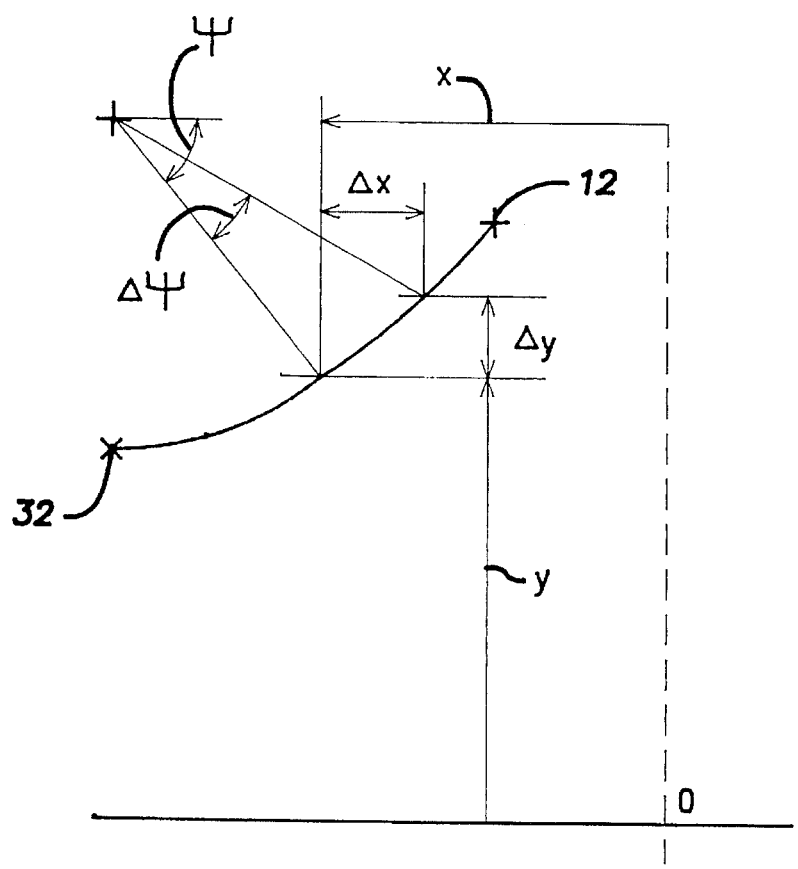
FIG. 3 is an illustration of a liner surface which comprises a reversely curved portion of the geodesic dome adjacent the polar opening.

In order to determine the curvature of that second surface portion of the dome indicated by the bracket 30 in FIG. 1, reference may be made to FIG. 3 which illustrates a second surface portion 30 in an exaggerated curve with the plotting of that curve progressing from the polar opening 12 to the point of inflection 32. As may be noted from FIG. 3, the progression is identical to the progression described in connection with FIG. 2, except that the radius is reversed to provide the reversed curvature past the point of inflection. In general, according to FIG. 3, $\psi = \psi - \Delta\psi$.

With respect to the second surface portion 30, as r approaches 1.22(d/2), r becomes larger and larger. Consequently, the arc described by r approaches a straight line. It is, therefor, reasonable to connect the curves of portions 22 and 30 with a short straight line, as shown in FIG. 4.

Figure 4:
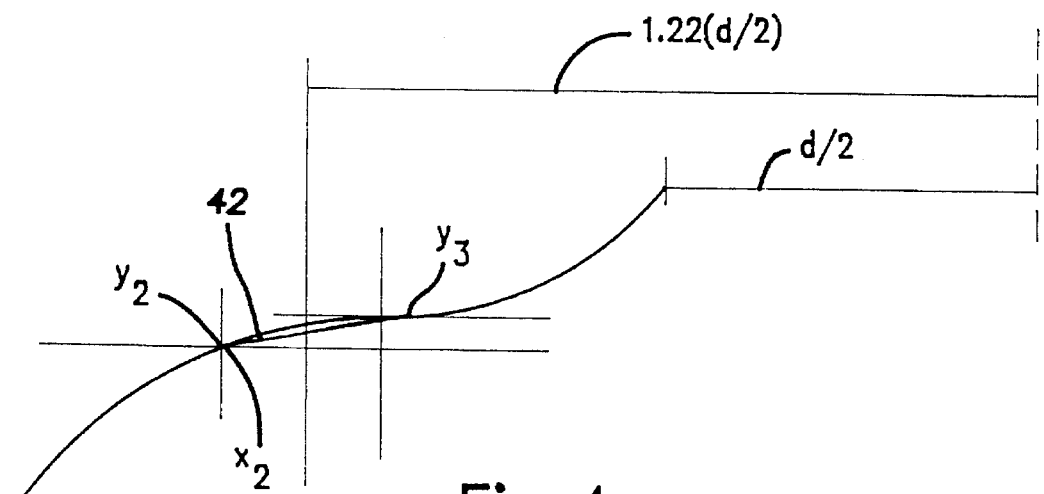
FIG. 4 is a representation of the geodesic surface of the tank liner from the diameter of the liner to the polar opening.

Referring now to FIG. 4, there is illustrated the first and second portions of reverse curvature 22 and 30, respectively, joined by a short straight line zone 42. It should be appreciated that the zone 42 has been greatly exaggerated for purposes of clarity. As is illustrated in FIG. 4, the curves 30 and 22 are joined by a very short, straight line 42 which generates a surface in accordance with the following formula:

$$y_3 = y_2 + m(x_2 - 1.22 \, (d/2))$$

where $y_2$ is a first point on the surface traced by the meridia and measured on the polar axis with the location of the first point being just unto, but not at, the inflection point $x_2 =$ the first point on the surface traced by the meridia but measured on the diameter of the mandrel $y_3 =$ a second point on the surface traced by the meridia and measured On the polar axis at a location just unto, but not at, the inflection point $m =$ the slope of the line, and $d =$ the diameter of the polar opening.

The provision of the very short, straight line enables the curved surface portions 22 and 30 to be joined. X and y axis numerical values may then be calculated from a given tank diameter and a given polar opening diameter. These values may then be programmed into a numerically controlled mold cutting machine according to prior art practices to produce a mold having the described curvature.

Although the preferred embodiments of this invention have been shown and described, it should be understood that various modifications and rearrangements of the parts may be resorted to without departing from the scope of the invention as disclosed and claimed herein.

What is claimed is:

1. A winding mandrel for a filament-wound pressure vessel, said mandrel having a geodesic surface to provide isotensoid loading of the filament, said surface extending between a diameter of said mandrel and a polar opening and being defined by first and second oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point.

2. A winding mandrel according to claim 1, wherein said mandrel is a thin-walled plastic liner for a filament-wound pressure vessel.

3. A filament-wound pressure vessel comprising a pressure vessel liner and a continuous filament polar wound over the surface of said liner in an isotensoid pattern, said liner having a geodesic dome surface extending between a diameter of said liner and a polar opening and being defined by oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point.

4. A filament-wound pressure vessel according to claim 3, wherein said liner is plastic and said continuous filament is glass.

5. A winding mandrel for a filament-wound pressure vessel, said mandrel having a geodesic surface to provide isotensoid loading of the filament, said surface extending between a diameter of said mandrel and a polar opening and being defined by first and second oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, both curvatures being in accordance with the formula:

where r = a radius of curvature of the meridia, x = a radial location on the surface traced by the meridia, ψ = an angle defined by the meridia at x with the diameter of the mandrel, Θ = a wind angle of the cylinder, said first and second surfaces being joined and said inflection point being traversed by a straight line third surface of revolution closely approximating geodesic curvature through the inflection point, said third surface being in accordance with the formula:

where $y_3$ = the said second point on the surface traced by the meridia and measured on a polar axis, $y_2$ = the said first point on the surface traced by the meridia and measured on the polar axis, $x_2$ = the said first point on the surface traced by the meridia and measured on the diameter of the mandrel, m = the slope of the line, and d = the diameter of the polar opening.

6. A winding mandrel according to claim 5, wherein said mandrel is a thin-walled plastic liner for a filament-wound pressure vessel.

7. A filament-wound pressure vessel comprising a pressure vessel liner and a continuous filament polar wound over the surface of said liner in an isotensoid pattern, said liner having a geodesic dome surface extending between a diameter of said liner and a polar opening and being defined by oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point:

$$r = \frac{x}{\cos\Psi(2 - \tan^2\Theta)}$$

where r = a radius of curvature of the meridia, x = a radial location on the surface traced by the meridia, ψ = an angle defined by the meridia at x with the diameter of the mandrel, Θ = a wind angle of the cylinder, said first and second surfaces being joined and said inflection point being traversed by a straight line third surface of revolution closely approximating geodesic curvature through the inflection point, said third surface being in accordance with the formula:

$$y_3 = y_2 + m \left[ x_2 - 1.22 \left( \frac{d}{2} \right) \right]$$

where $y_3$ = the said second point on the surface traced by the meridia and measured on a polar axis, $y_2$ = the said first point on the surface traced by the meridia and measured on the polar axis, $x_2$ = the said first point on the surface traced by the meridia and measured on the diameter of the mandrel, m = the slope of the line, and d = the diameter of the polar opening.

8. A filament-wound pressure vessel according to claim 7, wherein said liner is plastic and said continuous filament is glass.

* * * * *

UNITED STATES PATENT AND TRADEMARK OFFICE
CERTIFICATE OF CORRECTION

PATENT NO. : 5,526,994
DATED : June 18, 1996
INVENTOR(S) : James C. Murphy

It is certified that error appears in the above-indentified patent and that said Letters Patent is hereby corrected as shown below:

Column 3, line 66, "On" should be --on--.

Column 5, claim 5, lines 1-4,

The equation:
$$r = \frac{x}{\cos\psi(2-\tan^2\theta)}$$

should be inserted.

Column 5, claim 5, lines 16-19,

The equation:
$$y_? = y_? - m[x_? - 1.22(\frac{d}{2})]$$

should be inserted.

Signed and Sealed this

Seventeenth Day of September, 1996

Attest:

BRUCE LEHMAN

Attesting Officer        Commissioner of Patents and Trademarks